US009526258B2

(12) United States Patent
Roberds et al.

(10) Patent No.: US 9,526,258 B2
(45) Date of Patent: Dec. 27, 2016

(54) PROCESS AND APPARATUS FOR RAPID PREPARATION OF DRY SAUSAGE

(75) Inventors: James Roberds, Holt, MO (US); Larry Hand, De Soto, MO (US); Dave Taylor, Smithfield, VA (US); Paul Kafer, Carrollton, VA (US); Dan Glowski, Saint Charles, IL (US)

(73) Assignee: Smithfield Foods, Inc., Smithfield, VA (US)

( * ) Notice: Subject to any disclaimer, the term of this patent is extended or adjusted under 35 U.S.C. 154(b) by 35 days.

(21) Appl. No.: 13/180,206

(22) Filed: Jul. 11, 2011

(65) Prior Publication Data

US 2012/0282372 A1 Nov. 8, 2012

Related U.S. Application Data

(60) Provisional application No. 61/482,821, filed on May 5, 2011.

(51) Int. Cl.
| | | |
|---|---|---|
| A23B 4/01 | (2006.01) | |
| A22C 11/00 | (2006.01) | |
| A23B 4/03 | (2006.01) | |
| A23L 3/01 | (2006.01) | |

(52) U.S. Cl.
CPC ............ *A22C 11/00* (2013.01); *A23B 4/01* (2013.01); *A23B 4/03* (2013.01); *A23L 3/01* (2013.01)

(58) Field of Classification Search
CPC .......... A22C 11/00; A23B 4/03; A23B 4/031; A23B 4/00; A23B 4/005; A23B 4/01; A23L 1/00; A23L 1/31; A23L 1/317; A23L 1/3175; A23L 3/00; A23L 3/01; A23L 3/005; A23L 3/16; A23L 3/18; A23L 3/20
USPC .............. 426/55, 7, 56, 59, 106, 237, 238, 241,426/272; 425/55, 7, 56, 59, 106, 237, 238, 241, 425/272
See application file for complete search history.

(56) References Cited

U.S. PATENT DOCUMENTS

| | | | |
|---|---|---|---|
| 2,346,232 A | 4/1944 | Piret | |
| 3,482,996 A | 12/1969 | Christianson et al. | |
| 3,634,102 A * | 1/1972 | Paynter et al. | 426/404 |
| 3,650,767 A * | 3/1972 | Stump et al. | 426/284 |
| 3,664,396 A | 5/1972 | Tremblay | |
| 3,664,850 A | 5/1972 | Kentor | |
| 3,746,012 A | 7/1973 | Deszyck | |
| 3,831,389 A | 8/1974 | Lipona | |
| 4,013,797 A | 3/1977 | Gryczka | |
| 4,079,666 A | 3/1978 | Plemons et al. | |
| 4,166,138 A | 8/1979 | Ziminski et al. | |
| 4,196,222 A | 4/1980 | Cheney | |
| 4,200,959 A | 5/1980 | Cheney | |
| 4,218,492 A | 8/1980 | Stead et al. | |
| 4,260,640 A | 4/1981 | Hartmann et al. | |
| 4,265,918 A | 5/1981 | Kueper et al. | |
| 4,279,935 A | 7/1981 | Kentor | |
| 4,305,965 A | 12/1981 | Cheney | |
| 4,362,750 A | 12/1982 | Swartz | |
| 4,530,132 A | 7/1985 | Wagner | |
| 4,667,369 A | 5/1987 | Felstehausen | |
| 4,927,650 A | 5/1990 | Roberts | |
| 5,078,120 A | 1/1992 | Hwang | |
| 5,236,731 A | 8/1993 | Becker | |
| RE35,259 E | 6/1996 | Williams | |
| 5,736,186 A | 4/1998 | Holdren et al. | |
| 5,942,265 A * | 8/1999 | Roberds et al. | 426/59 |
| 6,524,633 B2 | 2/2003 | Rainbolt et al. | |
| 6,592,364 B2 | 7/2003 | Zapata et al. | |
| 6,629,493 B1 | 10/2003 | Schaible, II et al. | |
| 6,630,194 B2 | 10/2003 | Kunert et al. | |
| 6,713,107 B2 | 3/2004 | Shefet et al. | |
| 6,764,705 B2 | 7/2004 | Shefet | |
| 6,786,813 B2 | 9/2004 | Shefet et al. | |
| 6,821,542 B2 | 11/2004 | Shefet | |
| 6,855,047 B2 | 2/2005 | Shefet et al. | |
| 6,866,573 B2 | 3/2005 | Shefet et al. | |
| 6,869,352 B2 | 3/2005 | Shefet et al. | |
| 6,878,053 B2 | 4/2005 | Shefet et al. | |
| 7,004,307 B2 | 2/2006 | Shefet et al. | |
| 7,037,186 B2 | 5/2006 | Lagares Corominas | |
| 7,040,974 B2 | 5/2006 | Shefet | |

(Continued)

FOREIGN PATENT DOCUMENTS

| | | |
|---|---|---|
| EP | 2213178 | 8/2010 |
| WO | WO 89/00393 | 1/1989 |

(Continued)

OTHER PUBLICATIONS

Haghi & Amanifard (2008) *Brazilian Journal of Chemical Engineering* 25(3): 491-501.
FAO Corporate Document Repository, Meat Drying (2010).
USDA Requirements and Standard of Identity for Dry Sausage (MPR) in USDA Food Standards and Labeling Policy Book (2005).
Food Safety Regulatory Essentials Shelf-Stable Course, pp. 109-126, 119-120 (2005).
USDA Principles of Preservation of Shelf-Stable Dried Meat Products (2005).

(Continued)

*Primary Examiner* — Vera Stulii
(74) *Attorney, Agent, or Firm* — Hunton & Williams LLP

(57) ABSTRACT

A process for manufacturing dry sausage. The process includes preparing a dry sausage meat mixture, stuffing the mixture into a casing or mold, fermenting the mixture, heat treating the mixture, cooling the mixture to a temperature sufficiently low to permit slicing, slicing the sausage, placing the sausage onto a conveyor, and passing the conveyor and sausage through a chamber. The process also includes introducing a supply of conditioned air into the chamber, the air having a relative humidity below about 60% and a temperature in the range of at least about 40° F. to 130° F., and introducing a supply of microwaves into the chamber. The air supply and microwaves are selected to reduce the moisture content of the meat to a predetermined moisture to protein ratio.

30 Claims, 7 Drawing Sheets

(56) References Cited

U.S. PATENT DOCUMENTS

| | | | |
|---|---|---|---|
| 7,040,975 B2 | 5/2006 | Shefet et al. | |
| 7,074,120 B2 | 7/2006 | Shefet et al. | |
| 7,131,904 B2 | 11/2006 | Shefet et al. | |
| 7,165,570 B1 | 1/2007 | Lordahl et al. | |
| 7,182,683 B2 | 2/2007 | Shefet | |
| 7,195,551 B2 | 3/2007 | Shefet | |
| 7,390,246 B2 | 6/2008 | Shefet et al. | |
| 7,428,962 B2 | 9/2008 | Shefet et al. | |
| 7,568,971 B2 | 8/2009 | Shefet et al. | |
| 2002/0071899 A1* | 6/2002 | Rainbolt et al. | 426/646 |
| 2003/0039727 A1 | 2/2003 | Crocker | |
| 2004/0137135 A1 | 7/2004 | Margolis | |
| 2006/0196334 A1 | 9/2006 | Chen | |
| 2007/0065551 A1 | 3/2007 | Alton | |
| 2007/0248743 A1 | 10/2007 | Pullin et al. | |
| 2009/0092708 A1* | 4/2009 | Alvarado et al. | 426/62 |
| 2009/0181126 A1* | 7/2009 | Wicking et al. | 426/61 |
| 2012/0282372 A1 | 11/2012 | Roberds et al. | |

FOREIGN PATENT DOCUMENTS

| | | | |
|---|---|---|---|
| WO | WO 03/073871 | 9/2003 | |
| WO | WO-03/073871 A1 * | 9/2003 | A23L 1/31 |
| WO | WO 2005/092109 | 10/2005 | |
| WO | WO 2014/066133 | 5/2014 | |
| WO | WO 2014/071159 | 5/2014 | |

OTHER PUBLICATIONS

Alberts, et al. (1994) *Molecular Biology of the Cell* [$3^{rd}$ Ed.] Chapter 5: Protein Function, pp. 195-222.

Chen, et al. (2010) "Modeling Protein—Ligand Binding by Mining Minima." *J. Chem. Theory Comput.* 6: 3540-3557.

Mathews & van Holde (1996) *Biochemistry* Chapter 6: "The Three-Dimensional Structure of Proteins", pp. 165-213.

International Search Report and Written Opinion from International Patent Application No. PCT/US2013/65435, mailed Feb. 24, 2014.

*Making Healthy Sausage*, Marianski and Marianski (2011) Chapter 1 "Principles of Meat Science" pp. 11-22.

Encyclopedia of Meat Sciences, $2^{nd}$ Ed. Dikeman & Devine (Eds) "Chemical Composition" by Keeton, et al. (2014) pp. 235-243.

"Sausage Classification" from Course Materials, ANSC 307 Honors Lectures, Sausage Manufacturing, Dep't of Animal Science, Texas A&M Univ. (2015) [13 pages].

* cited by examiner

PROCESS AND APPARATUS FOR RAPID PREPARATION OF DRY SAUSAGE

RELATED APPLICATIONS

The present invention claims the benefit of U.S. Provisional Application No. 61/482,821, filed May 5, 2011, which is incorporated herein by reference in its entirety.

BACKGROUND OF THE INVENTION

Field of the Invention

The present invention relates generally to a process for preparing a dry or semi-dry sausage product. In one aspect, the present invention relates to the preparation of sliced dry sausage, wherein the sausage is heat treated with casings or moulds and the dehydrating step is performed using conditioned air and microwaves.

Description of the Related Art

Different processes have been used to manufacture cured, smoked, dried, and semi-dried sausages, including processes for preparing dry sausage (e.g., pepperoni, Genoa salami). In these processes, the initial meat mixture is cured and thereafter dried or heated in air, sunlight, drying rooms, or smokehouses. See FAO Corporate Document Repository (2010) "Meat Drying". The cure and drying process may last for days, or even weeks. A wide variety of final products and inconsistent qualities results from the use of well-established recipes and techniques.

Dry sausage is typically prepared by stuffing the desired meat mixture into fibrous casings and curing the resultant product for extended periods (e.g., over 7 days). This particular sausage is most commonly served in thin slices, with or without the casing (the casing being removed after heat treating). Sliced dry sausage are used in a variety of food applications, such as toppings, sandwiches, salad bars, and are often used in making pizzas (e.g., pepperoni pizzas).

The typical current practice is to prepare the dry sausage using conventional processes employing blending, stuffing the meat mixture into casings, heat treating or cooking a meat mixture, and curing, following which the product is thinly sliced. The slices may then be used by consumers or by foodservice operators (e.g., toppings, sandwiches, salad bars, and pizzas). Because the drying and curing process requires from several days to several weeks, production capacity for a manufacturing facility is limited to the amount of space allocated to the drying process. This process is capital intensive, and requires a tremendous amount of product to be held in process at any given period of time. Again, the preparation process of dry sausage (e.g., pepperoni) may take days or weeks. Several patents describe methods for to curing or drying dry sausage products.

U.S. Pat. No. 2,346,232 describes the preparation of semi-dried meat for food ration purposes by exposing the meat mixture to a turbulent air flow to reduce the moisture content from an original range of 45 to 85% to a range of 20 to 55%. The air used in this process was at a temperature of 0° C. to 30° C. (32° F. to 86° F.) and the air is moved across the meat surface at a velocity of 1 to 18 feet/second. The meat products discussed in U.S. Pat. No. 2,346,232 are produced in ¼ to 1¼ inch thick layers or in ropes of ⅜-inch diameter for drying. For ⅜-inch ropes, drying reduces the moisture to 28% in 8 to 13 hours, while the 1¼-inch layers require 13 days. The benefits of turbulent flow are alleged to be increased by 40% early in the process where the air contacts a moist surface, however, the effect of the turbulent air flow of this patent is substantially reduced as the drying continues. For example, in one test reported in U.S. Pat. No. 2,346,232, drying of ⅜-inch ropes from 55% to 40% moisture took just three hours, while a further reduction to 28% required an additional five hours. U.S. Pat. No. 2,346,232 does not disclose any direct relationship between the humidity of the air used in the process and the time of drying. Further, the product is held in flat trays in the examples.

Another process for preparing sausages is disclosed in U.S. Pat. No. 3,482,996 where the meat compositions include dehydrated, spun, edible protein fibers or dehydrated fibrous products derived from spun, edible protein fibers. The fibers allegedly take up the moisture which is removed in a drying room. U.S. Pat. No. 3,482,996, however, does not disclose the use of an air flow to dry sausage products.

U.S. Pat. No. 4,265,918 describes a technique that includes immersion of a meat product in a curing solution, followed by vacuum dehydration. The initial hydration step is to about 105 to 125% of the product's original weight, followed by vacuum treatment to reduce the overall product weight to 70 to 95% of its original weight. U.S. Pat. No. 4,265,918 does not disclose the use of air flow to dry sausage products.

Yet another process is described in U.S. Pat. No. 4,279,935 where bactericides and bacteriostats are first added to a meat, followed by treatment with an acidic mixture to reduce the pH to about 5.7. The sausage is then heated to 58° F. and dried to reduce the average moisture level to 35%. U.S. Pat. No. 4,279,935 discloses a drying time of 5 to 20 days and does not disclose the use of air flow to dry sausage products.

Further a process described in WO 2005/092109 uses vacuum-drying methods for drying meat products. However, this publication does not contemplate the use of air flow to dry sausage products; in fact, it uses low air pressure.

Additionally, these current processes require the dry sausage to be held in its casing during the curing and drying phase, thereby reducing the rate at which moisture may be removed from the product and adding to manufacturing cost. Holding the dry sausage in its casing during drying also disallows the ability to slice the product prior to drying, which would increase the surface area of the product and aid in moisture removal.

Accordingly, there exists a need for a method of manufacturing dry sausage that may address or even overcome one or more of the foregoing disadvantages. Further, there exists a need for improving the quality and the manufacturing processes of dry sausages.

BRIEF SUMMARY OF THE INVENTION

The present disclosure provides a number of new and useful advances that may be used together or separately. The recitation of this summary is not intended to narrow or limit the inventions described in the appended claims or any claims issuing from this or continuing applications.

One aspect of the present invention provides a process for preparing dry sausage. Another aspect of the invention provides an apparatus for preparing dry sausage. Another aspect of the invention may be to provide a cured dry sausage product which flows easily and which may be evenly spread on other food items (e.g., pizza.) A further aspect of the invention may be to provide a cured dry sausage product for use in sandwiches, retail dry sausage deli packaging, sliced cured dry sausage products (e.g., bags of sliced dry sausage), or inclusion in food items (e.g., soups, calzones, HOT POCKETS®).

A further aspect of the invention may be to employ a microwave drying system for drying dry sausage, which may be prepared for drying by blending uncooked (and/or non-heat treated) meat products and spices and heat treating the meat mixture and stuffing it into casings. The dry sausage may be sliced after it may be cooled to a temperature which facilitates this process. The temperature and humidity of the air flow within a microwave system used to dry the sausage may be controlled. For example, the microwave system may be coupled to sensors (e.g., infrared sensors), thermal imagine devices, vision systems, in-line checkweighers, or feedback control system.

In another aspect, the invention provides a process for preparing heat treated and/or cooked dry sausage comprising formulating a meat mixture to the desired specification and initially grinding the meat (e.g., beef and/or pork) to a size no greater than about one-half (½) inch. The meat may be then added to a blender and mixed with salt, culture, water and spices, oleoresins, and dextrose, optionally adding a cure (e.g., a source of nitrite, salt, and sugar). For example, the meat may be admixed with a cure (e.g., a source of nitrate, salt, and sugar), smoke (e.g., liquid smoke), culture, water, oleoresins, and spices. Blending may be carried out for about 5 minutes, after which a second grinding may occur, this time to a size no greater than about 3/16". Bone may be eliminated at this stage. In another aspect, the meat mixture may be formed by admixing the meat with salt, culture, water and spices, oleoresins, and dextrose, optionally adding a cure (e.g., a source of nitrite, salt, and sugar) and grinding the meat mixture then blending it in a blender as described herein. Also, the meat mixture may be formed by admixing the meat with salt, culture, water and spices, oleoresins, and dextrose, optionally adding a cure (e.g., a source of nitrite, salt, and sugar), blending the meat mixture, and then grinding a second time. Meat temperature may be maintained below about 40° F. in the blending and grinding process. Following the final grinding or blending step, the meat mixture may be stuffed into casing or moulds and may be transferred to ovens where it may be fermented or heat treated. For example, the meat mixture may be formulated, ground, blended and then stuffed into casings or moulds and then may be transferred to ovens where it may be fermented or heat treated. Also, the meat mixture may be formulated ground, blended, ground a second time, and then stuffed into casings or moulds and then may be transferred to ovens where it may be fermented or heat treated.

In the present invention, the heat treated sausage may be thereafter chilled to an internal temperature of below about 35° F., following which the heat treated, chilled meat mixture may be sliced. The meat mixture may be shaped into logs and a plurality of logs may be sliced at one time. For example, 3, 6, 9, or 12 logs may be arranged and sliced at a time. The dry sausage may be then transferred to the conveyor of a dryer unit where it may be exposed to conditioned air maintained between about 40° F. and 100° F. and a relative humidity below about 50% for a time of about 3 to about 15 minutes, or between 40° F. and 130° F. and a relative humidity of below about 60% for a time of about 1 minute to 30 minutes. For example, the conditioned air may be maintained between about 50° F. and 120° F. The relative humidity of the conditioned air may be below about 5, 10, 15, 20, 25, 30, 40, 50, or 60%. For example, the relative humidity of the conditioned air may be about 50-55%. The relative humidity of the conditioned air may be about 25% or below. The drying time may be about 1 to 30 minutes. For example, the drying time may be about 2 to 10 minutes, 2 to 15 minutes, or 15 to 30 minutes. Air flow through the dryer may be at least about 100 to 3,000 cubic feet per minute (cfm) at a linear air flow over the dry sausage of about 100 to 2,000 feet per minute. The air flow may be at least about 2,000 to 2,500 cfm, or at least about 2,000 cfm, and at a linear air flow over the dry sausage of about 1,000 to 1,500 feet per minute (ft/min), or at least about 180 to 900 ft/min. The linear air flow rate may be at least about 500 ft/min. Also, the linear flow rate of the air may be at a level where it is just below the point where it moves the product or blows it off the belt. Additionally, the air pressure in the dryer unit may be maintained at about atmospheric pressure (atm) (e.g., about 750 torr or 101 kPa). It will be understood that no particular airflow rate (either from a volume or a velocity standpoint) is specifically required, but the foregoing provide expected operating variables that are expected to be operative under various conditions.

The processes and systems may comprise product quality and yield instrumentation to monitor the product quality and yield. In one embodiment, a "pre-dried" product checkweigher may check the weight of the sliced sausage product after slicing but before drying in the dryer unit. A vision/camera system may be used prior to entry of the product in the dryer unit for monitoring the product load. After the product exits the dryer unit, thermal monitoring may be used for monitoring dry sausage product quality. A "post-dried" product checkweigher may be used for yield verification prior the dry sausage product to be conveyed to the freezing unit.

Moisture in the meat product may be reduced to ratio to meet USDA requirements and standard of identity with respect to protein. For example, the moisture to protein ratio may be at least about 1.6:1, 1.9:1, 2.0:1, 2.03:1, 2.04:1, 2.1:1, 2.25:1, 2.3:1, or 3.1:1. Further, the moisture to protein ratio may be about 2.3:1 to 1.6:1. The moisture to protein ratio may be at least about 1.6:1 or 2.3:1. It will be understood that the moisture to protein ratio may vary depending on the particular product; for example, a Pepperoni product might have a moisture to protein ratio of 1.6, whereas a Genoa Salami product might have a moisture to protein ratio of 2.3. Also, modifications may be made to the moisture to protein ratio to obtain benefits to the physical (e.g., toughness) or chemical (e.g., taste) properties of the product. The dry sausage may be then conveyed to a chiller, where it may be chilled or frozen for packaging and subsequent transfer to the customer.

Yet another object of the present invention may be the preparation of dry sausage in a relatively small amount of manufacturing space and in a minimal amount of time as compared to prior processes.

The foregoing and other objects and aspects of the present invention are explained in greater detail in reference to the description set forth herein. It will be understood that the foregoing and following descriptions of objects and embodiments of the invention are provided to explain possible exemplary embodiments of the invention, and are not intended to define or limit the scope of the claims.

DETAILED DESCRIPTION OF EXEMPLARY EMBODIMENTS

Figure 1:
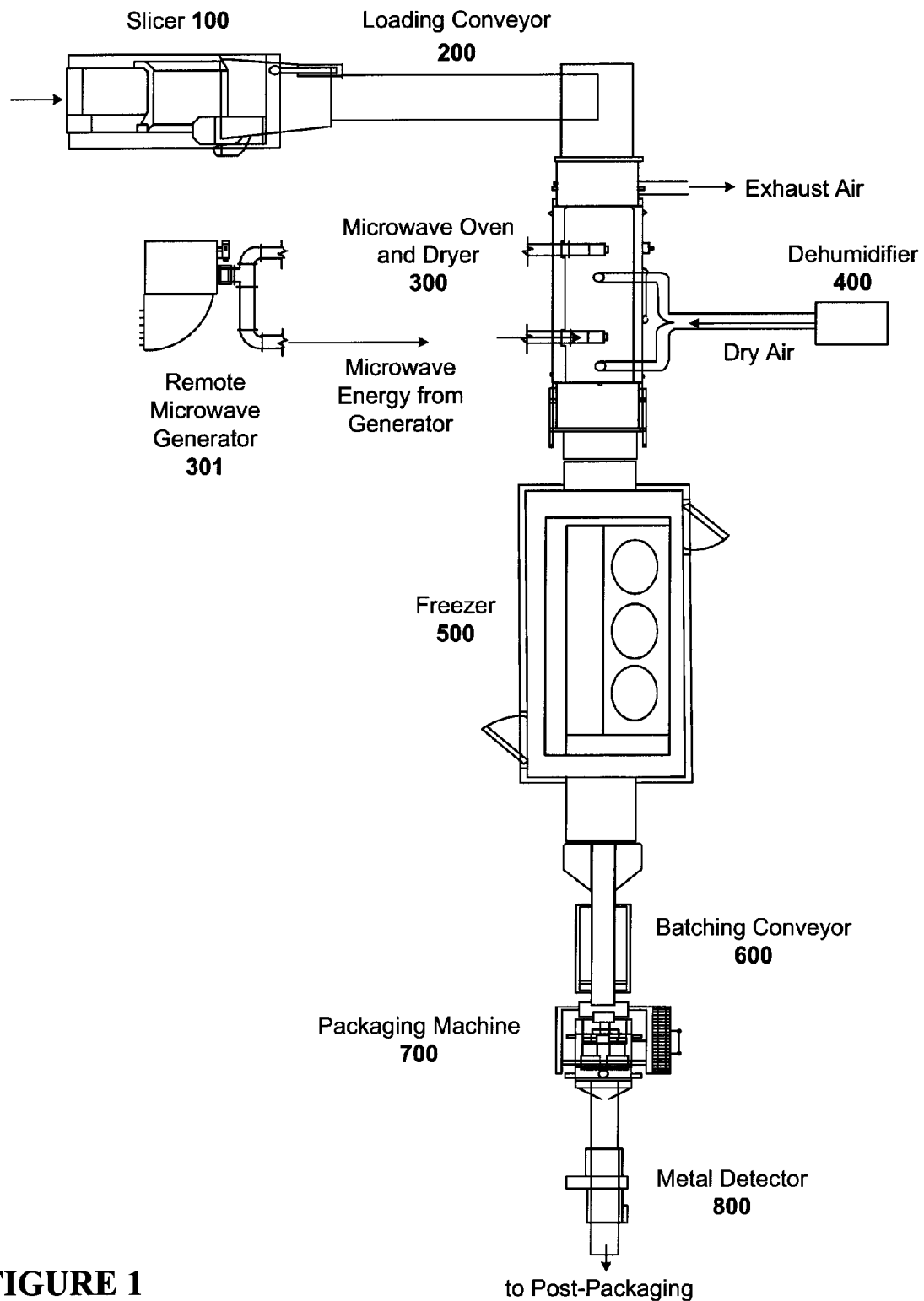
FIG. 1 depicts a top schematic view of an exemplary set of equipment used to carry out dry sausage slicing, microwave and air drying, freezing, and other steps.

The invention relates to a process for preparing dry sausage. In one exemplary embodiment, the process comprises preparing a dry sausage meat mixture; stuffing meat mixture into casing or moulds; fermenting the mixture at a temperature of at least about 100° F. for 12 hours; heat treating the mixture at a temperature at least about above 128° F. for an hour to prepare a heat treated sausage; cooling the heat treated sausage to a temperature sufficiently low to permit slicing (e.g., about 35° F.); slicing the cooled sausage; depositing the sausage slices onto the conveyor of a combined microwave and air dryer unit; passing conditioned air into and through the dryer unit; and wherein the conditioned air may have a relative humidity below about 60% (e.g., about 50-55%) and a temperature in the range of at least about 40° F. to about 130° F. (e.g., about 50° F. to 120° F.) when introduced into the dryer unit; and wherein the sausage slices are processed through the dryer unit for a time sufficient to reduce the moisture to protein ratio to at least about 2.3:1. A temperature sufficiently low to permit slicing may be about 0° F. to 35° F. The relative humidity of the conditioned air may be below about 5, 10, 15, 20, 25, 30, 40, 50, or 60%. The conditioned air may have a relative humidity below about 50-55%. In another embodiment, the conditioned air may have a relative humidity below about 50% or below about 25%. The conditioned air may have a temperature of between about 40° F. and 100° F. or between about 50° F. to 120° F. The moisture to protein ratio may be at least about 1.6:1, 1.9:1, 2.0:1, 2.03:1, 2.04:1, 2.1:1, 2.25:1, 2.3:1, or 3.1:1. For example, the moisture to protein ratio may be about 2.3:1 or 1.6:1. See, e.g., USDA Requirements and Standard of Identity for dry sausage (MPR) in USDA Food Standards and Labeling Policy Book (2005).

The inventors surprisingly discovered that the combination of rapid drying using a flow of conditioned air at a low temperature in conjunction with the application of microwave energy greatly reduced the processing time and costs but maintained a desirable qualities of the sliced dry sausage, but essentially without cooking the meat or melting fat in the meat, as would be expected when applying microwave energy to sausage. By the use of the dryer unit and process described herein, the overall processing time for making dry sausage may be dramatically reduced, and surprisingly the flowability of the resulting product may be increased. For example, a plurality of sliced dry sausage pieces processed according to one embodiment may be squeezed together under hand pressure and separated freely thereafter. This result is in contrast to the oily feel and tendency to clump together which occurs when using sliced dry sausage made by conventional processes. The process and apparatus described herein allows for an unexpected substantial reduction in processing time and the cost associated therewith using a system which occupies relatively little plant space and is highly reliable.

In one embodiment, the apparatus may include a Bry-Air dehumidifier system, a slicer, a tunnel chiller, and a single chamber packaging machine. The apparatus may be installed in a plant with the capability to process fermented logs, room for this equipment (e.g., near an outside wall for the Bry-Air system), and an area that is suitable for "Ready to Eat" product. Of course, multiple devices such as those described above may be operated in parallel or series at one or more stages of the process (e.g., two slicers per tunnel chiller, etc.), as will be readily understood by persons of ordinary skill in the art.

Definitions

Unless otherwise indicated, all terms used herein have the same meaning as they would to one skilled in the art. The USDA Food Standards and Labelling Policy Book (2005) identifies ordinary understandings for many terms.

"Dry sausage," and "Semi-dry sausage," as used herein, refer broadly to cured sausages that are fermented and dried. Dry sausages include but are not limited to pepperoni, chorizo, salami, Drodwors, Sucuk, Landjager, Frizzes, Lola (Lolita), and Lyons. Semi-dry sausages are usually heated to fully heat treat and/or cook the product and partially dry it. Semi-dry sausages include, for example, semi-soft sausages and summer sausage.

"Meat" broadly refers to red meat (e.g., beef, pork, veal, venison, buffalo, and lamb or mutton) and poultry meat (e.g., chicken, turkey, ostrich, grouse, goose, guinea, and duck). The meat used in the present invention may be "organic," "natural," "Kosher," and/or "Halal". The meat may be certified "organic" and/or "natural" by the appropriate state or Federal authorities (e.g., FDA and USDA) and/or by meeting the appropriate standards set forth by said authorities. The meat may be certified to be "Kosher" but the appropriate Rabbinical authorities (e.g., the Orthodox Union, Star-K, OK Kosher Certification) and/or by meeting the appropriate standards set forth by said authorities. The meat may be certified to be "Halal" by the appropriate authorities (e.g., Islamic Food and Nutrition Council of America).

"Reduce," as used herein, refers broadly to grind, dice, slice, chop up, comminute, pestle, granulate, press, cube, mince, mill, grate, grade, crush, roll, shear, divide, hew, or use any other method known in the art for changing a meat from one size to another. The resultant size of meat may be a mixture of sizes or a collection of sizes. Mixtures, collections, and assortments of sizes need not be consistent in that the mixture, collection, and assortment may contain particles of different sizes. The resultant sized meat particles may also be uniform or substantially similar in size.

"Starter culture," as used herein, refers broadly to an inoculum (composition) of lactic acid bacteria which converts added sugar to lactic acid producing fermented food stuffs. In particular, lactic acid bacteria are *Lactobacillus* species. In the present context, the term "lactic acid bacteria" refers broadly to a Glade of Gram positive, low-GC, acid tolerant, non-sporulating, non-respiring rod or cocci that are associated by their common metabolic and physiological characteristics. In particular, lactic acid bacteria ferment sugar with the production of acids including lactic acid as well as acetic acid, formic acid, and propionic acid.

Lactic acid bacteria are generally regarded as safe ("GRAS") due to their ubiquitous appearance in food and their contribution to the healthy microflora of human mucosal surfaces. The genera of lactic acid bacteria suitable for use in this invention include but are not limited to *Lactobacillus, Leuconostoc, Pediococcus, Micrococcus, Lactococcus, Bifidobacterium,* and *Enterococcus*. Other genera of bacteria suitable for use in this invention include but are not limited to *Staphylococcus, Brevibacterium, Arthrobacter* and *Corynebacterium*.

"Poultry," as used herein, refers broadly to category of domesticated birds kept by humans for the purpose of collecting their eggs, meat, and/or feathers, or wild birds that are harvested for similar purposes. Poultry, includes but is not limited to chickens, ducks, emu, geese, Indian peafowl, mute swan, ostrich, turkeys, guineafowl, common pheasant, golden pheasant, and rhea.

"USDA requirements and standard of identity," refers broadly to the requirements and standards promulgated by the U.S. Department of Agriculture and available in the USDA Food Standards and Labeling Policy Book (2005).

Proceeding now to a description of embodiments of the present invention, the process will be described first, and drawings will be used to illustrate an exemplary plant layout and an exemplary technique for modifying a dryer unit so that it may be used as a sausage drying apparatus and methods in the present invention.

Formulated Meat Mixture

The first step of the process may be the formulation of the meat mixture (e.g., beef, pork, poultry, game) to the desired specification, including the specification for fat. These specifications may be established by the processor or the customer. Initially, the meat may be coarse ground as is well known in the dry sausage industry. The meat may be ground to a size no greater than about 1/8, 1/4, 1/3, 1/2, 3/4, or 1 inch. In one particular embodiment, the meat may be ground to a size no greater than about 1/2 inch.

The formulated meat may next be placed into a blender where it is mixed with the salt, culture, water, and spices, and may further comprise oleoresins and a corn-based sweetener or sugar. The formulated meat mixture may be mixed with a cure comprising salt, a nitrite source, and sugar or corn-based sweetener (e.g., dextrose), culture, water, spices, and may further comprise oleoresins. Corn-based sweeteners include but are not limited to, corn syrup, Cerelose®, Clintose®, corn syrup solids, dextrose, fructose, high fructose corn syrup (HFCS), maltodextrins, or Staley-dex®. The particular meat mixture, including spices, flavorings, salt, and cultures may be widely varied by those skilled in the art. For example, encapsulated acids (e.g., lactic, citric, etc.) may be used to lower pH in the mixture as an alternate method of preparation to possibly eliminate fermentation and thus require only thermal processing of the mixture. As another example, honey, liquid smoke, spices in liquid or powder form, seasonings in liquid or powder form may be added to the meat. Further, sugar includes but is not limited to sucrose, raw sugar, natural sugar, organic sugar, brown sugar, organic cane syrup, organic cane sugar, white sugar, natural brown sugar, muscovado sugar, refined sugar, molasses, confectioners' sugar (powdered sugar), fruit sugar, milk sugar, malt sugar, granulated guar, beet sugar, and superfine (castor) sugar. Salt includes but is not limited to natural salt, natural sea salt, natural rock salt, sea salt, sodium chloride, table salt, natural hand-harvested salt, rare artisan salt, smoked sea salt, and gourmet sea salt, and also includes salt substitutes as used in reduced sodium products, as known in the art. Nitrate sources include but are not limited to vegetable juice powder, sea salt, celery salt, celery powder, celery juice, sodium nitrate, and sodium nitrite. The culture add to the formulated meat mixture may be an inoculum (composition) of *Lactobacillus* bacteria species. The starter culture composition may be provided in any form, including but not limited to a liquid, frozen, dried, freeze-dried, lyophilized, or spray-dried. The starter culture may be mixed in water, as is conventional, before addition to the meat mixture. Further, any one, all, or a combination of these ingredients may be added to the formulated meat mixture individually, in any order, or simultaneously. The blender may operate for about 5 minutes or other length of time preferably to thoroughly mix the ingredients if desired. Additionally, the meat may be ground before it is blended with the ingredients described herein. Also, the meat mixture may be formulated, then ground, and then blended as described herein.

Following blending, the meat mixture may be passed through a final grinder, where it is reduced to a size no greater than about 1/16, 1/8, 3/16, or 3/4 inches. In one embodiment, the meat mixture is reduced to a size no greater than about 3/16 inches. A bone elimination system may be used here, if bone has not been eliminated earlier in the process. Although grind sizes may be referred to for various stages of the process described herein, these sizes may also be varied by those skilled in the art who would also appreciate the corresponding need for further process modifications, for example in connection with times and temperatures. The size may be selected according to preferences for the final product's shape, texture, flavor and so on, as known in the art. When the meat mixture exits the final grind station, it may be at least about 60° F., 50° F., 45° F., 42° F., 40° F., 39° F., 38° F., 37° F., or less. In one embodiment, the meat mixture exiting the final grind station may be about 40° F. or less.

The inventors surprisingly discovered that the order of preparing the meat mixture had a direct effect on the quality of product produced. It was discovered that the meat mixture that was ground and then blended unexpectedly lead to a better quality product (e.g., few holes in the final sliced sausage). Without intending to be bound by any theory of operation, it is believed that this modification to conventional processes helped extract protein to encapsulate fat molecules, leading to the improved product. Regardless, in other embodiments, the meat mixture may be prepared by a blend then grinding process or an initial blend, grind, and then second blend process.

Stuffing into Casings or Moulds, Fermentation, Heat Treating, and Slicing

The next step in the process may be to mechanically stuff the meat mixture into casing or moulds. The casing or mould size, including length, shape and diameter, may be varied, with corresponding changes in the heat treating and fermenting parameters discussed. The stuffed or shaped logs may be transferred to ovens where fermentation takes place with the sausage temperature held about 100° F. for about 12 hours. Generally, fermentation conditions are defined by temperature, time, pH, and moisture. The end point of growth may be usually determined by time or measurement of pH. In preparing the cultured products of the present invention, the use of standard techniques for good bacteriological growth may be used.

The fermentation may take place at a temperature of from about 31° F. to 113° F. The fermentation may take place at a temperature at about 90° F. to 110° F., about 95° to 105° F., or about 100° F. (e.g., 100.4° F.). Other fermentation temperatures may be selected in other embodiments. The fermentation of the logs may take place over any suitable period to adequately prepared the logs for further processing, such as for a period of about 1 to about 25 hours. Preferably the fermentation may take place over a period about 10 to about 25 hours, preferably from about 12 to about 18 hours, and most preferably about 18 hours. Fermentation may be conducted until a desired endpoint is reached, for example, until the sausage reaches a pH within the range above about 4.5 to below about 6.0. In another embodiment, fermentation is continued until the sausage reaches a pH level above about 4.5 to below about 6.0, more preferably until a pH level of above about 4.5 but below about 5.5 is obtained. Also, fermentation may be conducted until the pH level is about 5.4. Alternatively, fermentation is conducted until the pH level drops to about 5.3 and is maintained for at least about 5 hours. See, e.g., Food Safety Regulatory Essentials Shelf-Stable Course (2005), pages 109-126, 119-120.

The sausage may then be heat treated, such as by placing it in an oven at least about 128° F. for at least about 1 hour. It should be noted that the foregoing heat treatment specification (i.e., at least 128° F. for 1 hour) is identified in government regulations relating to processing meats (see, 9 C.F.R. §318.10), but while it may be desirable to meet such regulations using some embodiments of invention, other regulations or guidelines may be satisfied in other embodiments, or in still other embodiments no particular regulation or guideline may be followed. In a subsequent heat treating step for about 1, 2, 3, 4, 5, 1-6, 2-5, or 3-4 hours about 140° F., the internal temperature of the sausage may be raised to at least about 128° F. for at least about 1 hour.

The heat treated sausage may then be cooled, such as by cooling to an internal temperature of about 35° F. or below. For example, the final slice temperature of the heat treated sausage may be about 0° F. to 35° F.

The cooled sausage may be sliced using a slicer (e.g., a Weber Model 905 slicer) to a size of about 4 mm or less. The slices may be about 1.25 mm to 2.5 mm. For example, the slice may be about 1, 1.1, 1.2, 1.22, 1.23, 1.24, 1.25, 1.3, 2, 2.5, 3, 3.5, 4, 4.5, or 5 mm. The slices may be 1.25 mm or 2.5 mm. The inventors discovered that the thickness of the slices may be controlled in order to control further processing of the dried sausage product. For example, slices thicker than about 4 mm may require more processing time or modification to other variables, such as microwave energy or airflow. In lieu of or in addition to slicing, the cooled sausage may be diced to form different shape products. Conventional dicing processes may be used, as known in the art. As with sliced product, the size of the diced product might implicate the further processing steps.

Drying Using a Dryer Unit

After slicing, the meat may be placed on the continuous conveyors of specially configured dryer unit. In a preferred embodiment, the dryer unit is a microwave oven that is coupled to a conveyored air dryer, e.g., an AMTek® Microwave with Aeroglide Impingement Conveyored Dryer may be modified to be used in the present invention. The shape, size and number of linear feet of conveyor required for a given operation may be readily determined by those familiar with this technology and in view of the present disclosure, by calculating the initial moisture level, the desired final moisture level, the relative humidity of the air, the total amount of water which must be removed, the temperature, and the conveyor speed, while some routine experimentation may be desirable to confirm or supplement such calculations and to determine the effects of combinations of variables and processing equipment. Additionally, spiral conveyor equipment is known for a variety of food preparation processes and may be used. In spiral conveyor equipment, a food product may be frozen or heated as it moves along a conveyor which forms a number of tiers or levels within a spiral system. See, e.g., U.S. Pat. No. 5,942,265, which is incorporated herein by reference. Another modification expected to provide improved results is the use of a multi-belt conveyor having multiple levels of belts or side-by-side belts. In such a system, the belts may be operated in parallel (i.e., multiple processing lines in the unit), series (i.e., product passes through the unit multiple times) or both.

The conveyor may move at speeds which may be controlled. For example a conveyor may be operated at a speed of about 50 to 300, 125 to 200, or 100 to 250 feet per minute. The dryer unit may be used to reduce the amount of moisture contained in the sliced product, from initial levels on the order of about 50% to a final moisture content where the ratio of moisture to protein is equal to or otherwise satisfies USDA Requirements and Standard of Identity. See USDA Food Standards and Labeling Policy Book (2005) and USDA Principles of Preservation of Shelf-Stable Dried Meat Products (2005). For example, the ratio of moisture to protein may be about 2.3:1, 2.2:1, 2.1:1, 2.0:1, 1.9:1, 1.8:1, 1.7:1, 1.6:1, 1.5:1, or 1.4:1. The moisture to protein ratio may be at least about 2.3:1 (e.g., Genoa salami), 2.1:1 (e.g., hard salami), or 1.6:1 (e.g., pepperoni). The ratio of moisture to protein may be about 1.9:1 or less (e.g., dry sausage).

This reduction in moisture content may be accomplished by exposing the dry sausage for about 15-30 minutes to air flow, such as turbulent or laminar air flow, within the dryer unit with the incoming air being dried to a relative humidity of below about 60%. The relative humidity of the conditioned air may be below about 5, 10, 15, 20, 25, 30, 40, 50, or 60%. For example, the relative humidity of the conditioned air may below about 50-55%. The temperature of the air entering the dryer unit may be maintained between about 50° F. to 120° F. The temperature of the air entering the dryer unit may be maintained between about 40 to 130° F., 50 to 120° F., or 60 to 110° F. The relative humidity may be below about 10%, 15%, 20%, 25%, 30%, 35%, 40%, 45%, 50%, 51%, 52%, 53%, 54%, 55%, or 60% and the exposure time may be up to about 10 to 35 minutes. In one embodiment, the air may be introduced at a temperature of between 40° F. and 100° F. at a relative humidity of below 50%, and the drying time may be between 3 and 15 minutes, although it is believed that even faster drying times, such as 2 minutes, may be accomplished with other embodiments of the invention depending on the adjustment of the variables and the particular material being processed.

The air flow through the dryer may be adjusted to suitably dry the product. For example, the air flow may be at least about 100 to 3,000 cubic feet per minute (cfm) at a linear air flow over the dry sausage of about 100 to 2,000 feet per minute (ft/min). The air flow may be at least about 2,000 to 2,500 cfm, or at least about 2,000 or 2,400 cfm, and/or at a linear air flow over the dry sausage of about 1,000 to 1,500 feet per minute (ft/min), or at least about 180 to 900 ft/min. Also, the air flow through the dryer may be about 1,000, 1,500, 2,000, 2,100, 2,150, 2,200, 2,300, 2,400 cubic feet per minute (ft/min) at a linear air flow over the dry sausage of about 1,000, 1,125, 1,250, 1,500, or 1,750 feet per minute (ft/min). The airflow may be turbulent, laminar, or any combination thereof. In one embodiment, the airflow may be set at a velocity that is just below the velocity at which the slices would begin to move or lift off the belt. Additionally, the air pressure in the dryer unit may be maintained at about atmospheric pressure (atm) (e.g., about 760 torr or 101 kPa) via the use of make-up air from the air flow system.

The dryer unit may also have additional scaling and monitoring equipment (e.g., vision cameras and thermal imaging devices) to allow for quality and yield validation of the sausage product. For example, a "pre-dried" product checkweigher may check the weight of the sliced sausage product after slicing but before drying in the dryer unit. A vision/camera system may be used prior to entry of the product in the dryer unit for monitoring the product load (i.e., placement, defects, and other properties of the product). A checkweigher or other monitor also may be provided within the dryer unit to confirm that processing is occurring as expected (e.g., at the expected weight and product placement on the conveyor), and such a system (or others) might be operated as part of a control feedback system. For example, if the mid-point checkweigher determines that product is still too heavy with water, later operations may be enhanced to accelerate the removal of water in the final processing steps. After the product exits the dryer unit, thermal monitoring or other monitoring systems may be used for monitoring dry sausage product quality. A "post-dried" product checkweigher may be used for yield verification prior the dry sausage product to be conveyed to the freezing unit. Also, monitoring instrumentation for measuring property values of "dry" supply air and "wet" exhaust air may be included in the system.

The conditioned air may be dried by utilizing a desiccant based system or other kinds of dehumidifier. In a desiccant based system, a wheel or other desiccant-laden part adsorbs moisture from the air, thereby providing air with very little moisture content, and then is regenerated with hot air that causes the adsorbed water to evaporate so that the desiccant material can be re-exposed to the air stream and remove moisture. Other kinds of dehumidifier might include a refrigerated coil that is used to condense moisture out of the air. Suitable dehumidifying equipment is readily available from companies such as Bry-Air, Munters, EVAPCO, and Frick. The ambient air coming off the system may be above 100° F., and the air may be cooled down to about 50° F. before re-entry. The temperature and humidity of supply air to the system at the discharge of the unit supplying the air may be measured using sensors, and the temperature and humidity of air leaving the system at the exhaust ductwork of the microwave cavity may be measured using sensors. This information may be used to control the temperature and humidity of the conditioned air.

The air flow may enter the dryer unit at several points. For example, in a dryer unit having a single microwave cavity, the cavity may have three points of entry for the air. Inside the cavity, the air may directed down onto the sliced sausage, but lateral and vertical flows could be used, as could combinations of flow directions. The air flow supplying the oven may be about 1000 cubic feet per minute (cfm) to 2500 cfm. The air velocity across the surface of the sliced sausage may act to remove moisture and heat. The air velocity may be about 1500 feet per minute (ft/min.) Higher air flow (cfm) and air velocity (ft/min) may shorten the drying time and/or allow for higher production rates through a given system. The exhaust of the system may also be modified. For example, the system described herein may have one exhaust fan in the center of the oven and may produce about 500 cfm of exhaust. Additional exhaust fans may be added to the system with a concurrent increase in the air supply to maintain approximately neutral pressure in the oven. Additionally, the conditioned air supply may be provided from the bottom of the conveyor in the dryer unit impinging on the product from the bottom side. Impingement of the conditioned dry air may accelerate the drying process. Other modifications as described elsewhere herein may also be used.

In units with multiple microwave cavities, each cavity may have its own separate air flow system, or the airflow may be interconnected between cavities.

The inventors surprisingly discovered that the temperature range in which fat melts in the meat mixture is important for optimizing processing time and product quality. Fats are generally heterogeneous compositions comprising different compounds with different characteristics, and these compounds melt at different temperatures. Thus, instead of changing from a solid to a liquid quickly, certain compounds melt at a lower temperature, weakening the overall structure (e.g., the fat begins to soften). Most solid fats do not melt suddenly at a precise point, but do so gradually over a range of about 10 to about 20 degrees. Eventually, all of the compounds melt and the fat becomes a liquid. Thus, the air temperature in the microwave oven and conveyor dryer may be about 40 to 130° F., or preferably 50° F. to 120° F. The upper limit of the range may be about 120° F. to 130° F. because the temperature at which fat melts depends on the fat (e.g., origin).

Measures also may be taken to ensure the internal parts within the dryer unit do not reach excessive temperatures that would sear the meat or heat the meat by radiation. For example, the conveyor movement and airflow may be sufficient to prevent a substantial or detrimental rise in surface temperatures of the conveyor or other parts. The exact selection of the temperature may vary depending on the composition of the fat in the particular meat(s) being processed. Additionally, thermal imaging or vision systems may coupled with the dryer unit to allow control of microwave power, belt speed, air flow, and air temperature. Sensors and other control systems may also be coupled with the dryer unit to allow monitoring of the production process (e.g., temperature, air flow).

Another characteristic of the microwave drying process may comprise pulsing the microwave energy to heat the sliced sausage. For example, the pulsing may comprise an on/off cycle for the microwave energy. The on/off cycle may comprise a 10/5 seconds, 10/7 seconds, 20/7 seconds, or a 22/7 seconds cycle (e.g., the microwave oven provides microwave energy for 10 seconds and does not for the subsequent 7 seconds.) The microwave oven may be provided in a steady stream or pulsed. Also, the microwave oven pulsing may comprise a plurality of the same on/off cycle or a mixture of different on/off cycles. For example, the sliced sausage may be dried by a series of three 20/7 second on/off cycles or a mixture of one 20/7 second, one 10/7 second, and one 22/7 second cycle. In one example, in which product is provided on a 48 inch wide belt through a single-cavity dryer unit with slices of sausage distributed along the full width of the belt, the power was set at 12 kilowatts (kW), and pulsed at a cycle of 12 seconds on, and 12 seconds off. In this example, product was dried in under 10 minutes to achieve a target moisture-to-protein ratio. In other systems, particularly ones with multiple cavities, the operating conditions including the microwave power, air flow, air temperature and pulsing sequence, may differ from cavity to cavity. As will be understood from this disclosure, loading characteristics of different products (either other kinds of sausage or products that are diced rather than sliced), might require variations to the processing variables, which can be readily determined with routine experimentation in view of the present disclosure.

Another characteristic of the microwave drying process is to drive the air flow down through the center of the conveyor over the food product. Although air distribution systems are known in the art, its use for drying dry sausage, particularly in combination with applying microwave energy, is not. The air drying method described herein combines low humidity and low temperature with a dry air flow down the center of the food product that unexpectedly produced a dried sausage product in a greatly reduced period of time (e.g., minutes versus days or weeks). The inventors surprisingly discovered that the low temperature and low humidity combination coupled with the direction of an conditioned air flow down the center of the food product in the microwave oven greatly reduced the processing time (e.g., curing time) of the dried sausage. This is in contrast to traditional curing processes which are long periods of time from days to weeks.

As will become more apparent when the plant layout is described later in this application, the appropriate characteristics for the air entering the dryer unit may be accomplished by the use of microwave energy but also using both steam coils and refrigeration coils. Any commercially available microwave oven may be used. For this application, and depending on ambient conditions existing in the plant, there may be a need to heat the air, or to cool it, and refrigeration systems are highly desirable to assist in water removal as is well known in the air-handling art. It is also possible to modify the system which will be described shortly to include chemical desiccant systems for moisture removal. Further information regarding the dryer will be provided in a subsequent section of the specification. For example, a system for the rapid preparation of dry sausage may product at least about 1,700 lb/hour of finished product. The system also may be adapted to better meet space requirements, for example, the oven may be wider instead of longer to conserve floor space.

Returning to the overall process characteristics, the sliced dried dry sausage is conveyed from the microwave cabinet to a freezing tunnel or other system for chilling or freezing the product for packaging or transfer for use with the particular final product (e.g., pizza, sandwich meat, calzones.) While drying may be completed in about 1 to about 30 minutes (e.g., 2 to 10 minutes), the time required for freezing or chilling the product, to below about 35° F. (e.g., about 0° F. to 35° F.), may be dependent upon the length of the freezer tunnel, the temperatures maintained therein and conveyor speeds. For example, the drying may be completed in 5, 10, 15, 20, 25, or 30 minutes. The drying time may also be about 2 to 10 minutes, 2 to 15 minutes, or 15 to 30 minutes.

Other types of food products may be dried at an accelerated rate in the dryer unit. The present disclosure refers generally to sausage (which takes many forms), but it could be applied to the production of other products such as jerky, dried snack sticks and others. By the use of the dryer unit described herein, the overall processing time for making dry sausage may be dramatically reduced, and surprisingly the flowability of the resulting product may be increased as noted above. The process and apparatus described herein allows for a substantial reduction in processing time and the cost associated therewith using a system which occupies relatively little plant space and is highly reliable.

Process for Making Dry Sausage

Proceeding now to a description of the drawings, FIG. 1 shows an exemplary plant lay-out for carrying out steps of the process of the prevent invention. The blending equipment—which may be provided upstream of the shown equipment—is not shown, as such equipment is well known in the art. In FIG. 1, the slicing 100, microwave drying 300 and cooling system 500 is shown to include one or more slicing machines 100, each of which deposits sliced dry sausage onto a loading conveyor 200. A single slicing machine 100 is shown, but other slicing machines may deposit meat onto the loading conveyor or other conveyors leading to the microwave over 300. As noted above, dicers may be used instead of slicers. The loading conveyor may be a transverse conveyor where product is uniformly distributed onto a continuous conveyor 304 of the dryer unit 300. Any suitable equipment for uniformly distributing the product onto the conveyor may be used. The energy used in the dryer unit 300 may be generated by a remote microwave generator 301. Dry conditioned air may be supplied by a dehumidifier 400. In other embodiments, the loading conveyor may terminate at a buffer, collator, shaker deck, or retractable loader. The output from the dryer unit is deposited on another transfer conveyor 501 for being moved toward freezer 500. If necessary, a mechanism may be provided to declump the product after it exits the dryer unit or at other stages; such declumping devices are known in the art and may take the form of spinning arms that gently contact and break up clumped product. Declumping midway through the drying process may be advantageous as well to redistribute product to help enhance drying. As product passes through the freezer 500, it is cooled as discussed herein. Finally, cooled product is deposited on a batching conveyor 600 for transport to a packaging machine 700 then to a metal detector 800 and post-packaging. The packaging machine may be a vertical or horizontal packaging machine including but not limited to a vertical Form/Fill/Seal (VFFS) packaging machine, horizontal Form/Fill/Seal (HFFS) packaging machine, or a premade pouch packaging machine. Further, the packaging may be modified atmosphere (MAP) or vacuum packed. The stuffing equipment is illustrated at area on FIG. 1. The processing area is illustrated in schematic form only, as that equipment, in and of itself, is conventional. Additionally, thermal imaging, sensors, or vision systems may coupled with the dryer unit to allow control of microwave power, belt speed, air flow, and air temperature.

Figure 2:
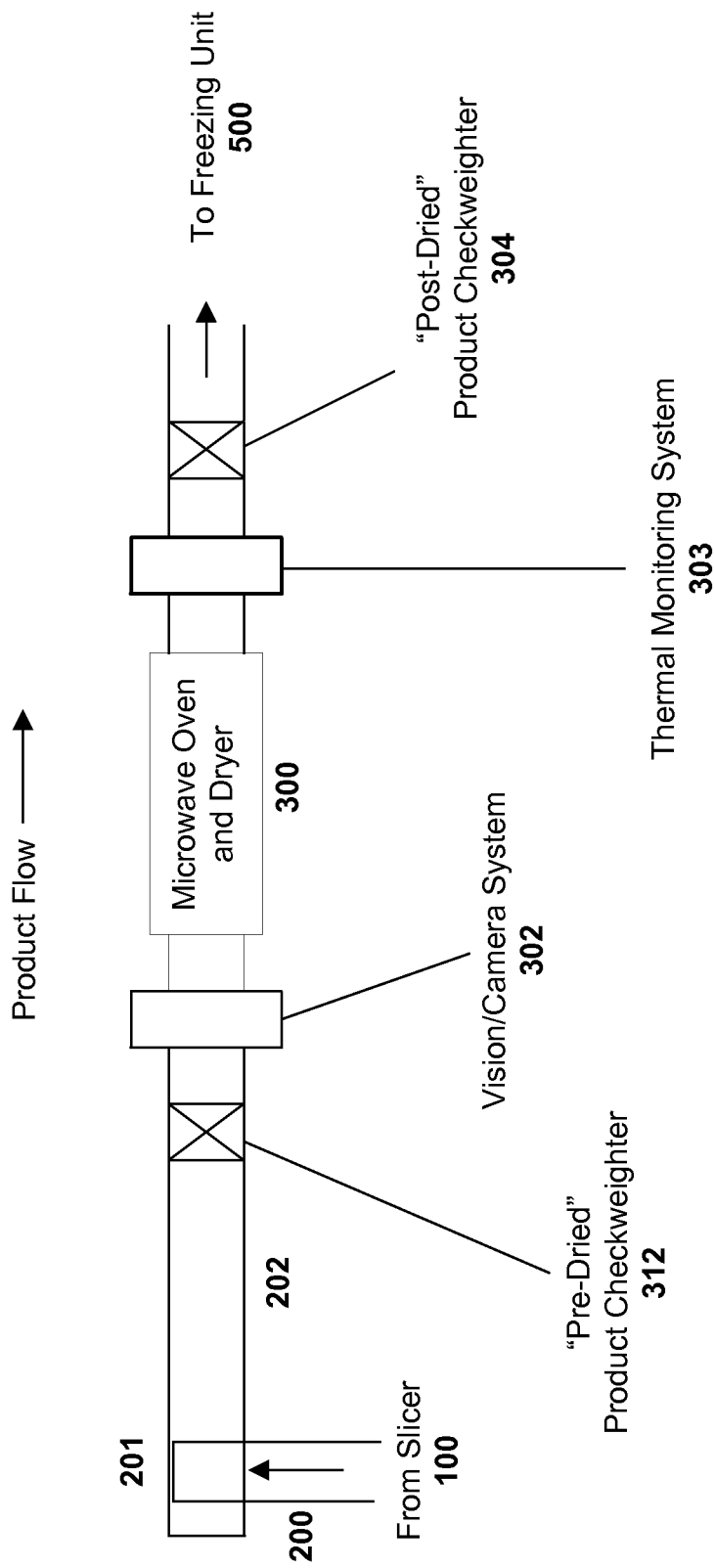
FIG. 2 depicts a plan view of the line with exemplary product quality and yield instrumentation, including a "pre-dried" product checkweigher and vision/camera system for monitoring load between the slicer and the dryer unit and a thermal monitoring for product quality and a "post-dried" product checkweigher for yield verification between the dryer unit and the freezing unit.

In FIG. 2, the dryer unit 300 receives the dry sausage from the slicer 100 via a loading conveyor 200. The conveyor terminates at a transverse conveyor 201 where product is uniformly distributed onto the continuous conveyor 202 of the dryer unit 300. In other embodiments, the loading conveyor may terminate at a buffer, collator, shaker deck, or retractable loader. The product within the dryer unit is exposed to a turbulent air flow where it may be dried to a relative humidity of below about 60% for about 1 to 30 minutes. The relative humidity of the conditioned air may be below about 5, 10, 15, 20, 25, 30, 40, 50, or 60%. For example, the relative humidity of the conditioned air may be below about 50-55%. Also, the relative humidity of the conditioned air may below about 25%. The drying time may also be about 2 to 10 minutes, 2 to 15 minutes, or 15 to 30 minutes. The temperature of the air entering the dryer unit may be maintained between about 40° F. to 130° F. For example, the temperature of the air entering the dryer unit may be maintained between about 50° F. to 120° F. Also, the temperature of the air entering the dryer unit may be maintained between about 50° F. to 130° F. The air flow through the dryer may be at least about 100 to 3,000 cubic feet per minute (cfm) at a linear air flow over the dry sausage of about 100 to 2,000 feet per minute (ft/min). The air flow may be at least about 2,000 to 2,500 cfm, or at least about 2,400 cfm, and at a linear air flow over the dry sausage of about 1,000 to 1,500 feet per minute (ft/min), or at least about 180 to 900 ft/min. As noted above, other air properties and air flow parameters may be used.

The microwave energy may be pre-set or actively controlled by utilizing inline checkweighers (e.g., at the entrance, middle, and discharge of oven), and/or infrared sensors to monitor the product leaving the oven and feedback to control system to adjust microwave power and/or pulse time (on/off). Additionally, thermal imaging, sensors, or vision systems may coupled with the dryer unit to allow control of microwave power, belt speed, air flow, and air temperature. For example, a "pre-dried" product checkweigher 312 may check the weight of the sliced sausage product after slicing but before drying in the dryer unit. A vision/camera system 302 may be used prior to entry of the product in the dryer unit for monitoring the product load. After the product exits the dryer unit, thermal monitoring system 303 may be used for monitoring dry sausage product quality. A "post-dried" product checkweigher 304 may be used for yield verification prior the dry sausage product to be conveyed to the freezing unit. Also, monitoring instrumentation for measuring property values of "dry" supply air and "wet" exhaust air may be included in the system.

Figure 3:
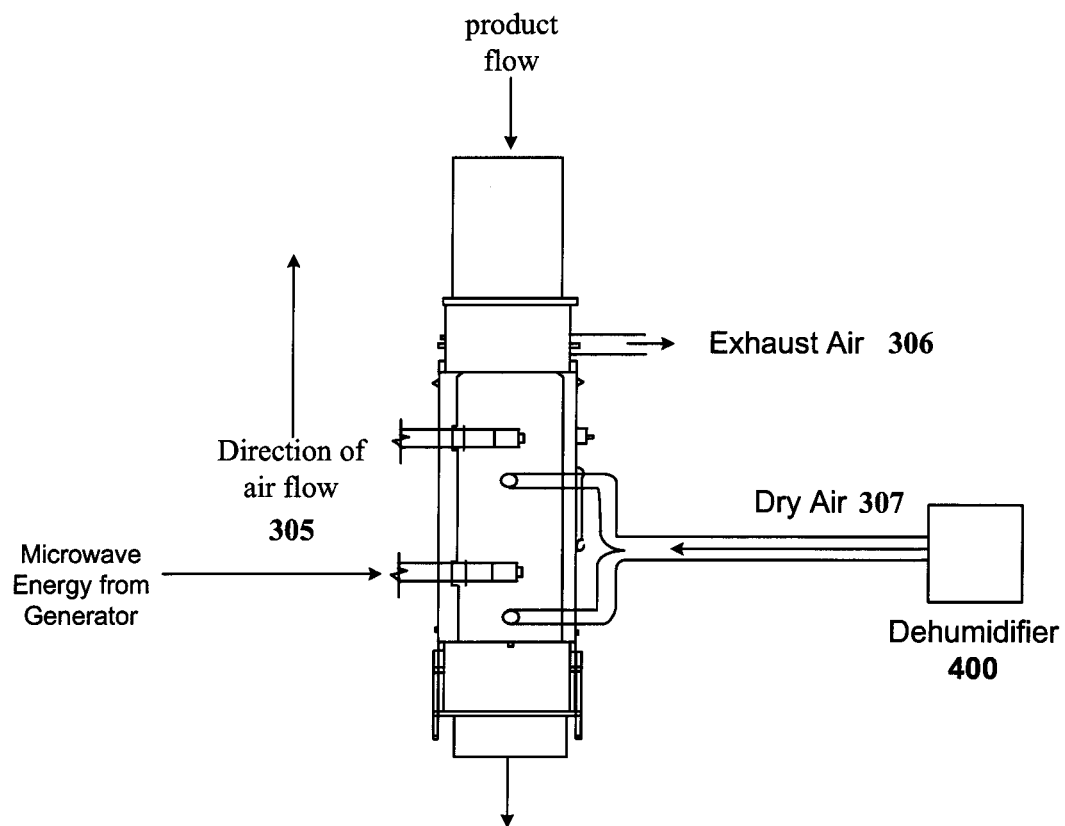
FIG. 3 depicts a schematic illustration of an exemplary dryer unit showing one configuration of air flow and product flow.

As depicted in FIG. 3, the direction of air flow 305 may be opposite the direction of the dryer unit 300, in which case the dryer unit may maintain a gradient of dry air flowing over the dry sausage slices, with relatively dry air at the microwave oven's product exit, and relatively moist air 306 at the product entry end of the dryer unit 300. The conditioned air 307 that passes over the center of the sliced dry sausage on the conveyor may have a relative humidity of below about 50-55%, as measured when the air enters the dryer unit 300. The conditioned air for the coupled dryer unit 300 may be introduced at the top and from the bottom, thus providing direct conditioned air over the sliced sausage. The conditioned air creates a "wind-chill" effect which both whisks moisture off the product surface and cools the product surface via evaporative cooling to prevent undesirable heating of the product. The inventors surprisingly discovered that this combination of the removal of the moisture and the cooling of the product surface prevented the heating of the product to the temperature at which the fat may melt (e.g., 120° F.-130° F.). This had the unexpected effect of reducing the formation of holes in the finished product which renders the finished product unusable for many applications (e.g., pizza topping or sandwich meats). A recirculating system may be used, in which dry air 307 may be supplied by a dehumidifier 400 which reduces the humidity of the exhaust air 306 received from the dryer unit 300. In other embodiments, the system may not recirculate air. The dehumidifier may supply the dry air 307 to the dryer unit under positive pressure (e.g., about at least one atmosphere pressure, i.e., 101 kPa or 760 torr). Additionally, sensors may coupled with recirculating system to allow control of air flow, air temperature, or air pressure.

In one configuration as depicted in FIG. 3, the conditioned air enters from one end of the drying unit and exhausts at a distant end producing a parallel-flow or cross-flow drying. See FIG. 3. For example, the microwave energy may travel through "waveguides" (depicted on the left side of the dryer unit 300), and the dry air 307 may enter from the opposite side.

Although FIG. 3 depicts one dryer unit section, the dryer unit may be a chamber that has multiple connected or spaced apart modules that operate in series or parallel with respect to the processing path of the product. Such a dryer unit chamber may be provided, for example, by using separate microwave or/air flow cavities located within a single continuous chamber, or forming the chamber as a series of spaced microwave and/or air flow cavities. The separate cavities may be separated by microwave chokes that inhibit or block microwaves from passing between cavities. Such chokes are known in the art. Separate cavities also may be separated by restricted passages (e.g., passages that are the full width of the belt, but relatively low, such as being only 4 inches high for a 48 inch wide belt), to help isolate air flow from one microwave cavity from the next. The use of multiple cavities may be particularly beneficial to provide different processing parameters in the different cavities. For example, one cavity may have different microwave intensities and/or pulse patterns as compared to one or more other cavities. Or, one cavity may have different air flow rates, temperatures or pressures than another one of the cavities. Of course, both the microwave properties and the air properties may vary from cavity to cavity. It is expected, for example, that a process may successfully operate having microwaves provided in a first cavity (with or without a conditioned air flow), and only a conditioned air flow provided in a second, downstream, cavity.

Figure 4:
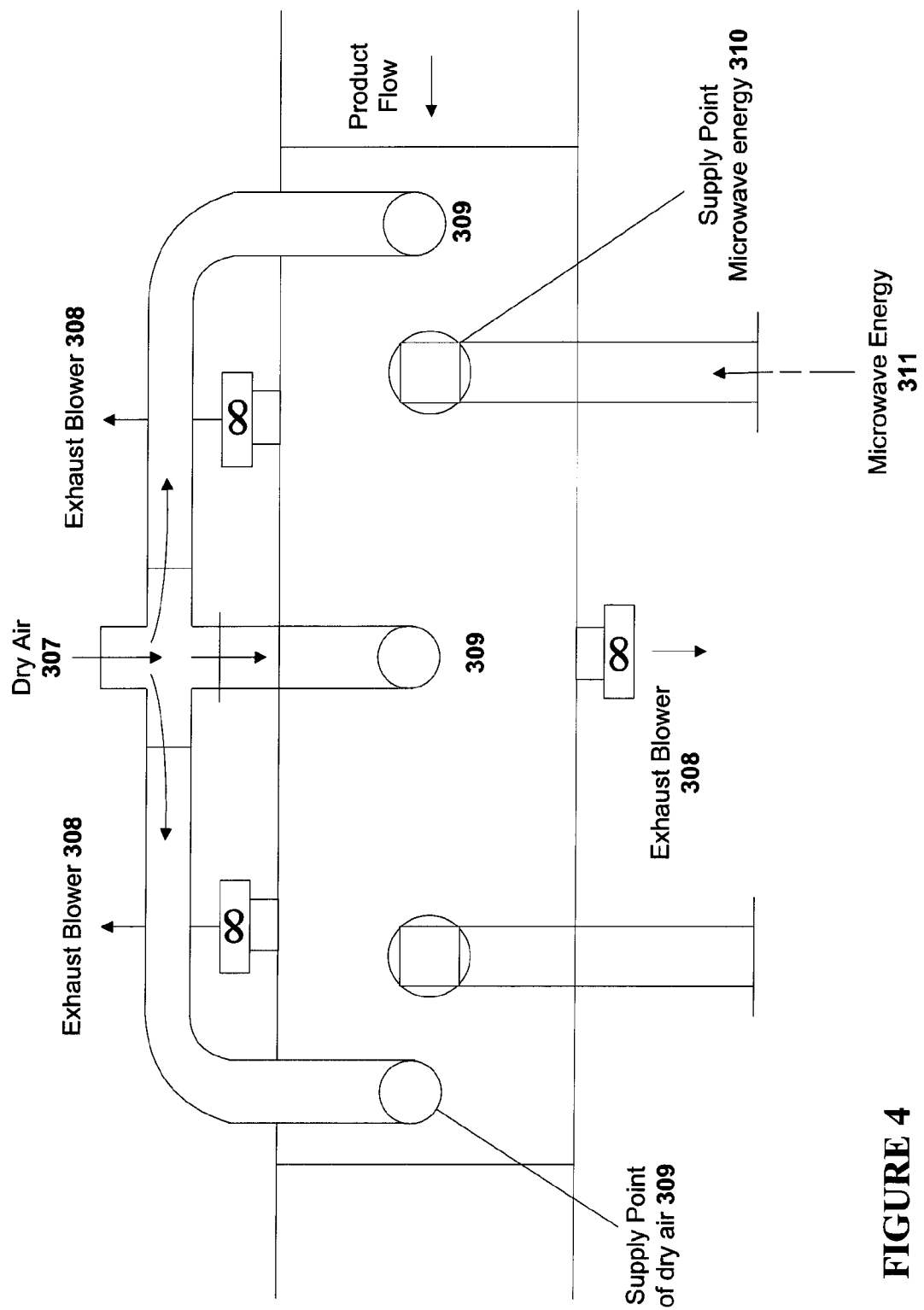
FIG. 4 depicts a schematic illustration of an exemplary dryer unit configuration comprising three entry points for conditioned dry air from the top of the microwave and air dryer unit, three exhaust points on the side of the dryer unit, and two supply points of microwave energy on the top of the microwave and air dryer unit.

In FIG. 4, the conditioned dry air may be introduced into the dryer unit from the top at one, two, three, or more locations. The dryer unit 300 configuration may comprise three entry points for conditioned air 307 from the top 309 of the dryer unit 300, three exhaust points 308 on the side of the dryer unit, and two supply points of microwave energy 311 on the top 310 of the dryer unit. The microwave supplies 310 may be simple microwave guide outlets, or they may include features to help distribute the microwave energy, such as a rotary microwave feed (e.g., a rotating disc that deflects the microwave energy emitted from the microwave guide.) The exhaust blowers 308 (or simply outlets not having blowers on them) may be connected to a common header and located below the belt line. The microwave energy may be from a generator and supplied in top of the oven 311. In other embodiments, different arrangements of outlets may be used. For example, three outlets may be located along the bottom of the oven and dryer. Also, different airflow arrangements may be used in other embodiments. For example, in a system having three air openings on the top of the unit arranged along the product processing direction, and three air openings on the bottom of the unit arranged along the product processing direction, two upper and two lower openings may be inlets, and one upper and one lower opening may be outlets. The inlets may be the openings furthest downstream so that the air flows generally against the direction of product movement, but other arrangements may be useful.

Air may be exhausted from one side (e.g., center and from the bottom). Air may also be exhausted on the opposite side, closer to the discharge and from the bottom. In another embodiment, the conditioned air may be supplied "up" from the bottom impinging the product from the bottom side which may further accelerate the drying process.

Figure 5:
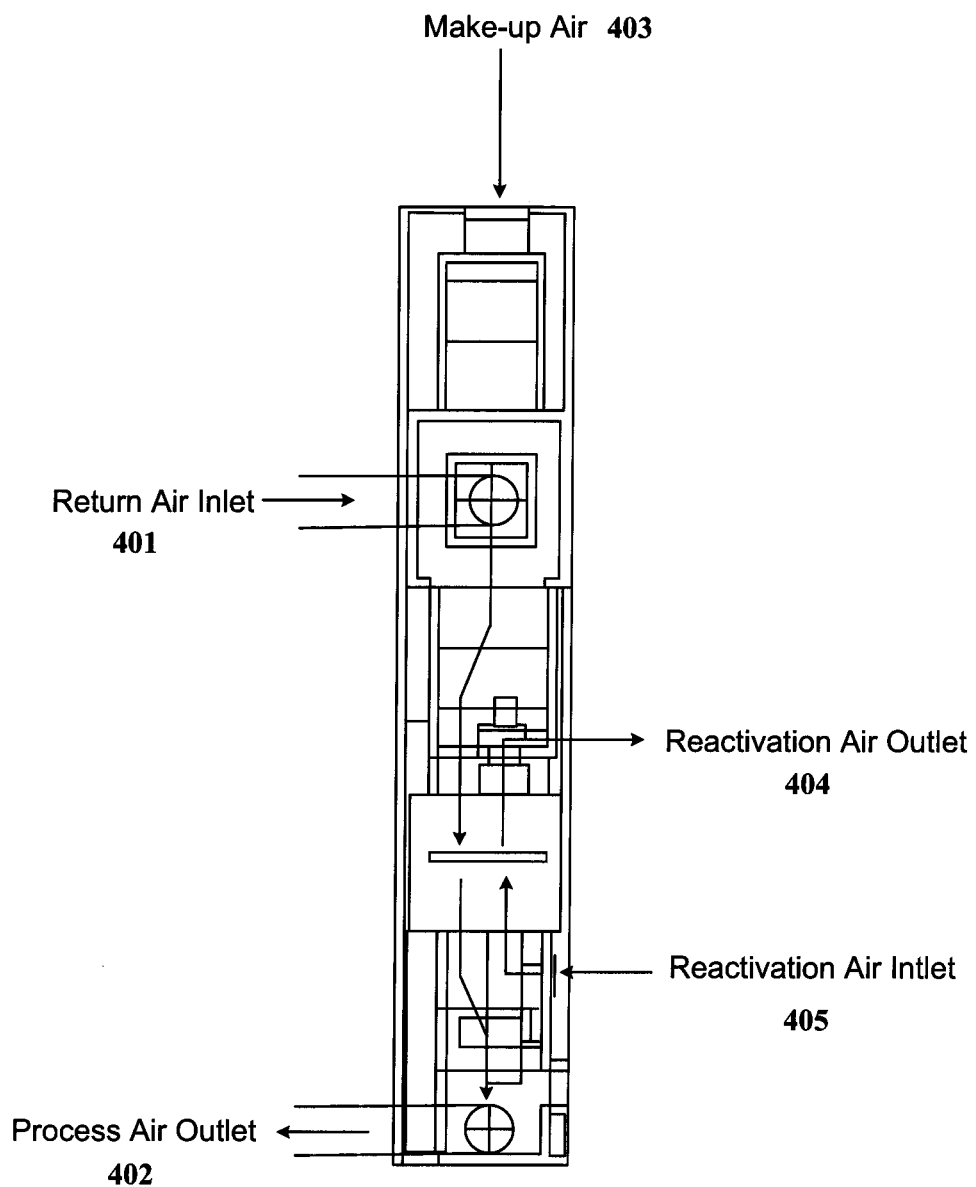
FIG. 5 is a schematic view of an exemplary dehumidifier for the supply of dry conditioned air.

In FIG. 5, the dehumidifier 400 dries the air taken from the dryer unit, preferably maintains a constant air flow rate and pressure in the dry air 307 supplied to the dryer unit. Of course, such pressure and flow rate may vary once the air passes through the dryer unit 300. The dehumidifier 400 takes in air from the microwave oven in a return air inlet 401, removes moisture from the air, and returns dry air to the dryer unit via a process air outlet 402. The dehumidifier 400 may maintain air pressure via make-up air 403, taking in air to compensate for any air leaks that occur within the dryer unit or elsewhere in the air circuit. Any suitable dehumidification system may be used. For example, the dehumidifier 400 may comprise an adsorption-type dehumidifier that uses a desiccant material that is alternately exposed to the working airstream (i.e., the airstream passing through the dryer unit) to adsorb moisture from the air, and then to a reactivation airstream that dries the desiccant. Such a system would include the shown reactivation air inlet 405 and outlet 404 for the airflow that reactivates the desiccant by drying it. For example, the desiccant may be provided on a rotating wheel that passes through the working and reactivation airflows, or in stationary beds over which the airflows are alternated. Additionally, thermal imaging, sensors, or vision systems may coupled with the dehumidifier to allow control of the air humidity and air temperature. Other dehumidifiers 400 may use refrigeration coils to condense water out of the air, which may be used in conjunction with a heater to reheat the air. These and other dehumidifier systems are known in the art.

Figure 6:
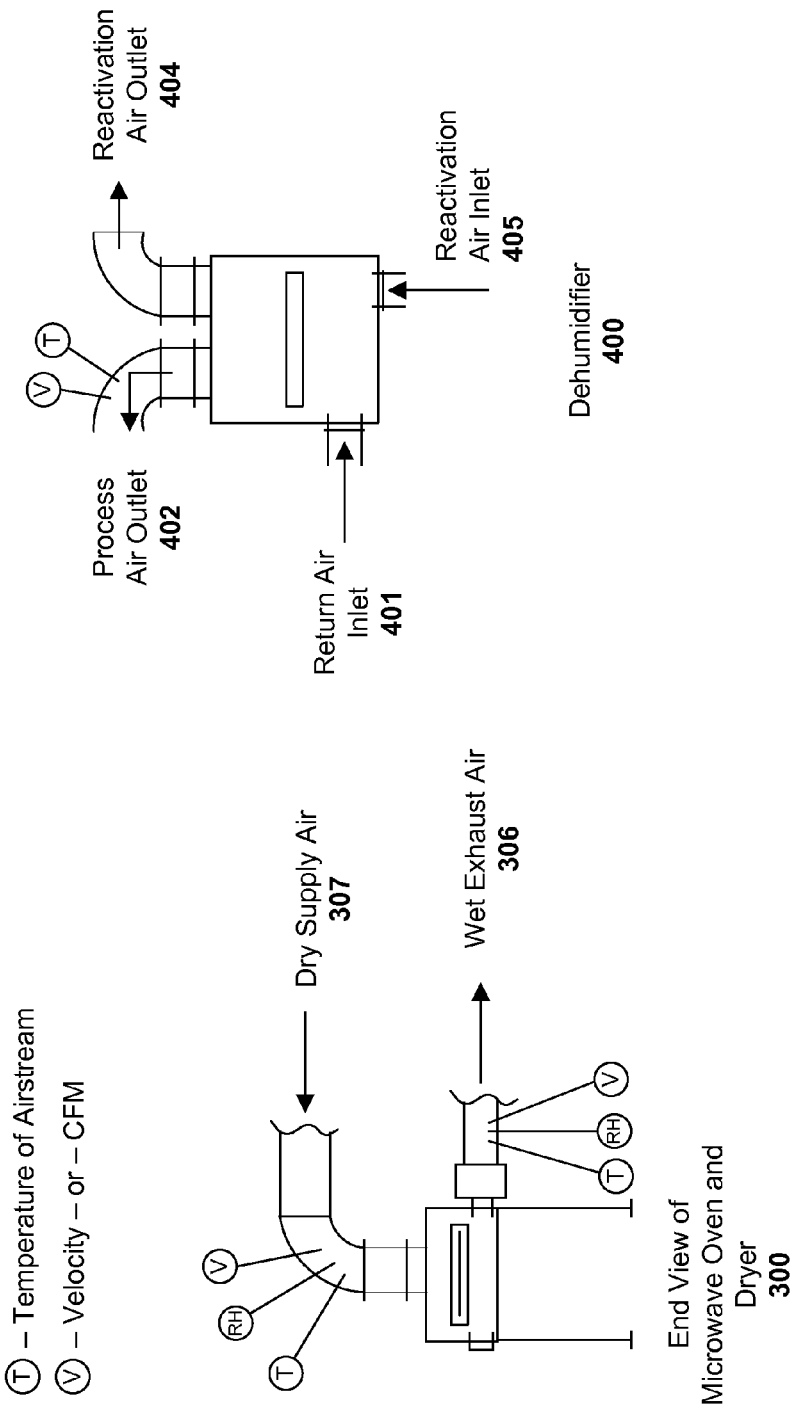
FIG. 6 depicts exemplary monitoring points for measuring various exemplary properties of air passing through the system.

In FIG. 6, monitoring points for evaluation and control of the conditioned air flow are shown including an end view of the dryer unit 300 and the dehumidifier 400 (e.g., desiccant wheel style). In the end view of the dryer unit 300, the dry supply air 307 enters the dryer unit 300, passes over the product, and then exits as relatively humid exhaust air 306. Near the inlet of the dry supply air 307, the relative humidity, airstream temperature, or velocity (or CFM) of the air may be monitored using probes. Near the outlet of the "wet" exhaust air 306, the relative humidity, airstream temperature, or velocity (or CFM) of the air may be monitored using probes. Multiple locations for inlets of dry supply air 307 and outlets of wet exhaust air 306 may be included. In the dehumidifier 400, near the process air outlet 402, the airstream temperature, or velocity (or CFM) of the air may be monitored using probes.

Figure 7:
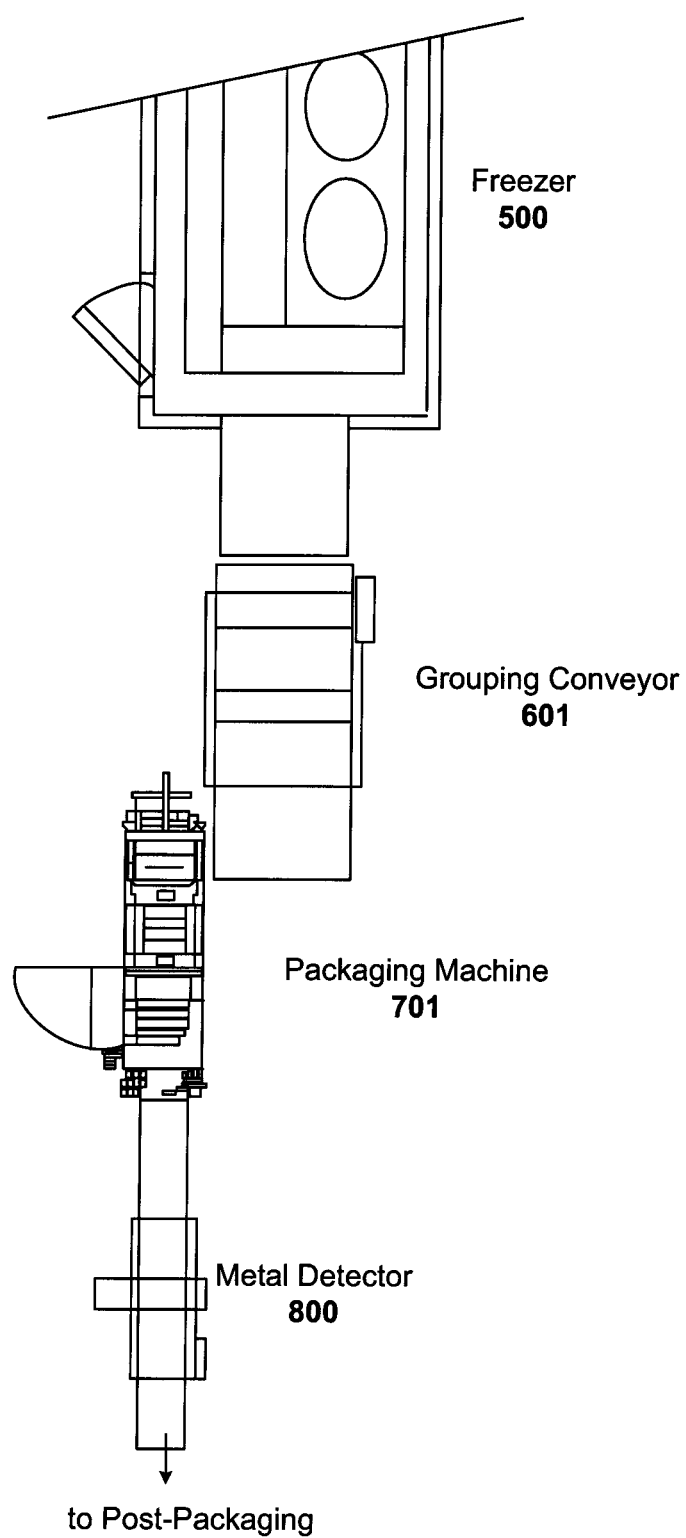
FIG. 7 depicts a top schematic view of an exemplary set of equipment used to carry out dry sausage freezing and packaging steps.

In FIG. 7, the freezer (e.g., freezing tunnel) 500 cools the dry sausage for packaging or transfer for use with the particular final product (e.g., pizza, calzones, sandwiches, packages of sliced dry sausage.) While drying may be completed in about 1 to 30 minutes, the time required for freezing or chilling the product, to below about 35° F., may be dependent upon the length of the freezer tunnel, the temperatures maintained therein and conveyor speeds. For example, the drying time may also be about 2 to 10 minutes, 2 to 15 minutes, or 15 to 30 minutes. Further, the temperature of the dry sausage may be about 0° F. to 35° F. Freezers are known in the art and need not be described in detail herein. Additionally, thermal imaging, sensors, or vision systems may coupled with the freezer to allow control of temperature or belt speed. The product may then be transported by a conveyor or sets of conveyors 601 to a packaging machine 701 and a metal detector 800 and then to post-packaging. The packaging machine may be a vertical or horizontal packaging machine including but not limited to a vertical Form/Fill/Seal packaging machine, horizontal Form/Fill/Seal, or a premade pouch packaging machine.

Now that the equipment and the processes have been described in sufficient detail to enable one skilled in the art to practice the preferred form of the invention, it will be even more apparent how variations of time, temperature and humidity may be made by those skilled in the art to take into account a particular processing environment. For example, relatively more heat must be added to the air flow in colder climates, while if processing were to take place in humid, warm environments, such as the southern part of the United States, especially during the summer, additional refrigeration capacity might be needed to lower humidity to a level of below about 60%. The relative humidity of the conditioned air may be below about 30, 40, 50, or 60%. For example, the relative humidity of the conditioned air may be about 50-55%. Additionally, the relative humidity of the conditioned air may be about 25%. It may also be necessary to maintain the air in a cooled condition downstream of the refrigeration coils if ambient temperatures are in excess of about 90° F., the upper end of the preferred processing range.

Systems that use air flow alone to dry meat sausage after slicing are believed to only use a permeable casing to contain the meat. In the present invention, it is believed that the meat may also be stuffed into permeable or non-permeable casings prior to slicing and drying. Further, the present invention allows for the meat product to be shaped into logs using moulds and then extruded and sliced prior to drying.

Moreover, in the present invention, air flow not only dries the meat (e.g., reduces the moisture) but maintains the temperature of the sausage product below the temperature at which the fat in the meat product would melt (e.g., 120° F. to 130° F.). This avoids the problem of rendering the sausage product which occurs when the fat in the sausage product melts. For example, the use of a microwave oven alone to dry meat products may lead to melting the fat in the sausage product and this ruins the product by changing the moisture, consistency, and flavor of the sausage product. Further, the use of a microwave oven alone to dry meat products, especially sliced sausage product may leave large holes in the meat product rendering it unusable for end uses (e.g., pizza topping, sandwich meat).

Accordingly, the inventor surprisingly discovered that the combination of the use of conditioned air flow and microwave heating allows for the rapid drying of sliced dry sausage without rendering the product. For example, the use of conditioned air flow and microwave heating allows for the rapid drying of sliced dry sausage while achieving the desired moisture (e.g., 1.6:1 moisture-to-protein ratio or 2.3:1 moisture-to-protein ratio), consistency, and flavor. Each alone, has the problem of being limited to permeable casings and slow drying time in air flow alone; or damaging the sausage product to make it undesirable in using microwave drying alone. In the present invention, the combination of the conditioned air flow and microwave drying, it is believed that the conditioned air flow removes the moisture from the surface of the sausage product and the microwave evacuates moisture from the center of the meat product. This combination results in a synergy that allows for a more uniform and consistent drying of the meat product while maintaining the sausage product below the temperature at which the fat inside the sausage product would melt, thus avoiding problems with air flow or microwave drying alone.

In addition to providing improved product feel and greatly reduced processing times, processes as described herein also may provide benefits to other parts of the manufacturing process. For example, by slicing the product before passing it through the dryer unit, the product may be in its final form and ready for packaging and shipment immediately after leaving the drying unit (of course, it may still be chilled, stacked or otherwise processed after leaving the dryer unit to preserve and package the meat). In this sense, it can be said that the meat is processed into its final commercial shape before it even enters the dryer unit. Despite this advantage, it may be desirable to conduct further shape processing, such as further slicing or dicing, after the product leaves the dryer unit. Indeed, such further operations may even be facilitated by the reduced moisture to protein ratio of the meat after it exits the dryer unit.

Although certain manufacturers, model names and numbers are given for machinery used in the invention, other machinery may be substituted, as would be appreciated by those skilled in the art.

Although certain ranges are provided for the humidity, temperature, conveyor speed, and air flow characteristics, these can be varied based on the particular volumes desired, space requirements and other needs. After reading this specification, one skilled in the art will understand that the selection of working or optimum numbers for these variables may be made once the plant and overall process parameters of a particular processing installation are known.

Additionally, although preferred systems are disclosed for controlling the temperature and the humidity of the air conveyed to and removed from the housing for the microwave oven and conveyor, these may be varied. These may be varied by substituting, for example, chemical for mechanical systems or direct for recycle heating of the air, depending on normal plant considerations of energy cost, plant lay-out and the like, and generally the temperature and humidity values used in the process tolerate some ongoing variability due to, for instance, changes in ambient plant temperatures and humidity and other related factors.

Further embodiments of the present invention will now be described with reference to the following examples. The examples contained herein are offered by way of illustration and not by any way of limitation.

EXAMPLES

Example 1

A process for the production of dry sausage was tested. The process provided rapid drying of fermented and heat treated meat to produce dry sausage such as Genoa salami and pepperoni. Drying was accomplished by slicing the product and using a combination of microwave energy and conditioned air as described herein.

Equipment

The following equipment was used: (a) WEBER® 402 slicer; (b) AMtek® Microwave oven, 1 cavity, outfitted with supply and exhaust air. Dimensions: 120 in long by 48 in. wide. One microwave transmitter feeding the cavity was the set up; and (c) AIR LIQUIDE® Nitrogen Chamber (for product chilling).

Summary

The product produced closely matched the desired yield parameters (e.g., 18% drying loss for Genoa salami and 22% for pepperoni) and the slices were 1.1 mm thick (prior to drying) using the following conditions:

TABLE 1

| Product | Slicer | Belt Speed (in/min) | Microwave Power (kW) | Exhaust | Supply Air |
|---|---|---|---|---|---|
| Genoa salami | 3 logs across | 36 (residence time of 3.3 min) | 3 | 1 fan on nearest feed end of oven in cavity 1 | 1 fan on top of cavity 2 |
| Pepperoni | 3 logs across | 24 (residence time of 5 min.) | 3† | 1 fan on nearest feed end of oven in cavity 1 | 1 fan on top of cavity 2 |

†The microwave power was pulsed with a 10/7 second cycle (e.g., 10 seconds with the microwave power on and 7 seconds with the microwave power off).

For both the Genoa salami and pepperoni, there was one exhaust fan at the nearest feed end of the oven in cavity 1 and one supply air fan on top of cavity 2.

Observations

Using this configuration and microwave oven, three lanes of Genoa salami had a production rate of 25.7 lb/hr. and pepperoni had a production rate of about 16.9 lb./hr. The product temperature exiting the oven on the product was about 90° F. to 100° F. The exhaust air temperature when microwaves were being generated was about 80° F. to 85° F. The product thickness was about 1.02 mm to 1.09 mm. The product diameter did not change much through the process, and was larger than control samples, thus it may be possible to reduce stuffing diameter.

The inventors discovered that the products were susceptible to holes forming where temperature exceeded melting point of fat. Unexpectedly, dry, conditioned air coupled with microwave heating boosted productivity and achieved better product quality.

Example 2

The use of microwaves to dry sausage presents a challenge because microwaves work by exciting water molecules which creates heat. The goal was to warm the product in order to get the moisture to release, but the microwave energy can also concentrate on the product (e.g., "the hot spot phenomena"). This hot spot issue will cause the fat to melt, and make holes appear in the product, which is detrimental to appearance, and would not be appealing to consumers. This is what happened during the First Trial. This was overcome this by using cooler air and also pulsing the microwave energy (e.g., an on/off cycle where the microwave energy is on for X seconds and off for Y seconds).

The inventors also surprisingly discovered that the process to create the raw meat block affected the final product. By changing the process from blending then grinding to grinding then blending, the overall quality of the product was unexpectedly improved. This was contrary to the traditional process because one would not want to do this since it slows down the drying process (e.g., grinding then blending is undesirable). However, the reversal of this order in the present invention unexpectedly resulted in accelerate drying (e.g., about 5 minutes) and an improved product (e.g., fewer holes in the slices). Without being bound by a theory of operation, it is believed the enhanced results were due to the grinding step extracting protein to encapsulate fat molecules.

Further, the first fan produced approximately 500 cfm of exhaust and a second fan on the opposite side of the oven was provided to achieve 1500 cfm of exhaust (e.g., the cavity may have went from being under positive pressure to negative pressure since supply was 1000 cfm). Additional make-up air may be used to balance supply and exhaust to achieve an approximately neutral pressure in the oven.

There were several changes made to the process to address the formation of holes that occurred in the first trail (Example 1), and to enhance drying time. The AMTek microwave cavity was modified to add three air intake openings and one exhaust located in the middle of the oven below belt level, for exhausting outside the room. A portable A/C unit was supplied to provide cool dry air to the three air intake openings. The process to manufacture the meat block was changed to grind first then mix, and mixing times were slightly extended. The purpose of this step was to encapsulate fat and protect fat from melting which cause holes in the product. This trial used INTRALOX® raised rib belting, so that more surface area of the slices would be exposed to cool dry air. Also, a Weber model 305 slicer was used. Finally, instrumentation was used to monitor air intake and exhaust flow, temperature, and relative humidity.

Discussion and Results

Large (e.g., about 89 mm) diameter pepperoni was chosen for the first run in this Second Trial. The initial settings used were the same as used in Example 1. The belt speed at was about 24 inches/minute and the microwave power was at about 3 kW with microwave pulse set ON for about 10 seconds; OFF for about 7 seconds.

The first run used air from the portable A/C without cooling. The only exhaust used was the one installed from the middle of the cavity. The goal of this test was to attempt to achieve 50% of target moisture removal in the first pass, then take the product back through for a second pass. Product was aligned in two rows across from the slicer. Product exit temperature after the second pass was in the mid 80° F. range. This resulted in a cycle time of 10 minutes.

The second run was conducted to evaluate product performance and used the following settings. The microwave power was at about 2 kW with no pulse. Cool air was pumped into the microwave oven (49° F. to 50° F.). The second run started with a belt speed of 30 inches per minute and increased in stages up to 90 inches per minute (product was being heat treated at lower belt speeds).

The product temperature at discharge ranged from 90° F. to slightly over 100° F. The total cycle time was about 2.67 minutes. There were more holes in this product than in the first run, but not as much as the runs in Example 1.

The third run was designed to achieve dry target yield in one pass. The belt loading by increased by changing the layout to 4 slices across belt width. The settings were changed to microwave power at about 4 kW, with microwave pulse ON for about 20 seconds; OFF for about 7 seconds. The dry yield was slightly off target at first, so the pulse was changed to ON for about 22 seconds; OFF for about 7 seconds. This setting brought yield to target with product temperature at discharge ranging from about 70° F. to 85° F. A second exhaust fan closest to the discharge end was activated. This had an effect of reducing product temperature variation across the belt to a range of about 75° F. to 80° F. The total cycle time to achieve target dry yield was about 5 minutes.

The fourth run was on small diameter (e.g., about 50.5 mm) product. The initial settings included microwave power at about 4 kW, with microwave pulse ON for about 20 seconds; OFF for about 7 seconds and a belt speed at about 24 inches/minute.

The settings were adjusted until target yield and appearance were achieved with microwave power at about 3 kW, with microwave pulse ON for about 22 seconds; OFF for 7 about seconds and a belt speed at about 30 inches/minute. Further, two exhaust fans were used. The total cycle time to achieve target dry yield was about 4 minutes.

Conclusion

It was surprisingly discovered that the pulsing off of microwave power assisted in controlling the process. The pulsing of microwave power unexpectedly provided an off-time of the microwave energy, to prevent overheating of the product and allow for removal of moisture by conditioned air. It is expected that the pulsing of the microwave energy may be controlled automatically using vision, thermal imaging or inline checkweighers to accurately reduce the moisture content of the product.

Additionally, a portable A/C unit was used to supply drier air. The use of conditioned air (e.g., cool dry air at about 50° F.) unexpectedly improved the process. A desiccant system (e.g., Bry-Air system) may enhance moisture removal and further reduce drying time.

The change in the process to grind first and then mix was unexpectedly successful. This results surprisingly suggests that some of the steps taken in the traditional process to limit protein extraction may not needed in this process (e.g., reduction in the number of steps in the method to achieve the desired product). Also, automation of blending may be used in this process providing further time savings.

Thus, the inventors surprisingly discovered that the combination of pulsed microwave power in combination with conditioned air provided an unexpected synergy that lead to an improvement in the product quality and a reduction in the drying time. Further, the process of grinding first and mixing second resulting in an unexpected improvement in the product quality (e.g., fewer holes in the sausage slices). While the combination of these two aspects is beneficial, either could be used alone in embodiments of the invention.

Example 3

A third run was performed, again using the WEBER® 402 slicer and a dryer unit comprising an AMtek® Microwave single-cavity oven and supply and exhaust air provided by a Bry Air dehumidifier using a cooling coil/condenser to dry the air. The slices were distributed across the full width of the belt manually by two operators, but automated systems are expected to provide similar results. The microwave cavity was twelve feet long with a 48 inch wide conveyor belt. The cavity included six openings for air supply and exhaust (three on top arranged along the length of the belt, and three on the bottom arranged along the length of the belt). The openings could be selectively attached to hoses to introduce and exhaust the drying air. Various airflow patterns were found to be useful to dry the air. In one particular arrangement, the four downstream openings were used to introduce air, and the two upstream openings were used to exhaust air.

Using this setup, pepperoni slices were processed to a target moisture to protein ratio of 1.6. The microwave source was operated at 12 kW, and repeatedly pulsed on for 12 seconds, and off for 12 seconds. Airflows such as described above were used in this process. This arrangement achieved a moisture to protein ratio of 1.47 in only 9.6 minutes of processing time. The production rate for this trial run was fifty-two pounds per hour.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in food chemistry, food processing, mechanical engineering, and/or related fields are intended to be within the scope of the following claims. As just one example, energy sources other than microwaves (e.g., infrared, direct or indirect heating or other radiation having frequencies other than microwave frequencies) may be used in conjunction with forced air to provide unexpectedly efficient product drying.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

While the foregoing invention has been described in connection with this preferred embodiment, it is not to be limited thereby but is to be limited solely by the scope of the claims which follow.

We claim:

1. A process for preparing dry sausage comprising
   (a) preparing a dry sausage meat mixture,
     wherein said preparation comprises encapsulating fat with protein;
   (b) stuffing the mixture into a casing or mould;
   (c) fermenting the mixture;
   (d) heat treating the fermented mixture;
   (e) cooling the mixture after heat treatment to a temperature sufficiently low to permit slicing;
   (f) cutting the cooled mixture to form sausage pieces;
   (g) placing the sausage pieces onto a conveyor;
   (h) passing the sausage pieces on the conveyor through a chamber,
     wherein the sausage remains in the chamber for less than 30 minutes;
     wherein the chamber also contains a supply of conditioned air having a relative humidity below about 60% and an air temperature in the range of about 40° F. to 130° F.;
     wherein the product temperature is maintained in the range of about 90° F. to about 100° F.; and
   (i) introducing into the chamber a supply of microwaves in pulses while the sausage pieces pass through the chamber,
     wherein the microwaves are provided at about 2 to about 20 kilowatts, and
     wherein the supply of conditioned air and the supply of microwaves are selected to reduce the moisture content of the sausage pieces to a predetermined moisture to protein ratio.

2. The process of claim 1, wherein step (a) comprises grinding and blending the dry sausage meat mixture twice.

3. The process of claim 1, wherein the step of cutting the mixture in step (f) comprises slicing the mixture.

4. The process of claim 3, wherein the mixture is sliced in step (f) into slices having a thickness of about 4 mm or less.

5. The process of claim 1, wherein the step of cutting in step (f) the mixture comprises dicing the mixture.

6. The process of claim 1, wherein the conditioned air is passed through the chamber at a volume sufficient to cause a linear air flow velocity over the sliced sausage to be about 100 feet per minute.

7. The process of claim 6, wherein the linear air flow velocity is about 100 feet per minute to 2,000 feet per minute.

8. The process of claim 1, wherein the conditioned air is introduced into the chamber from above and below the sausage pieces.

9. The process of claim 1, wherein the conditioned air is supplied as a turbulent air flow.

10. The process of claim 1, wherein the conditioned air has a relative humidity of below about 50-55%.

11. The process of claim 1, wherein the conditioned air has a relative humidity of below about 25%.

12. The process of claim 1, further comprising the step of cooling the sausage after it leaves the chamber.

13. The process of claim 1, wherein the pulses comprise a repeating on/off cycle of about 2 to 30 seconds on, and about 2 to 30 seconds off.

14. The process of claim 1, wherein the pulses comprise a repeating on/off cycle of about 10 seconds on and about 7 seconds off.

15. The process of claim 1, wherein the pulses comprise a repeating on/off cycle of about 12 seconds on and about 12 seconds off.

16. The process of claim 1, wherein the microwaves is provided at about 12 kilowatts.

17. The process of claim 1, wherein the sausage remains in the chamber for about 2 to about 10 minutes.

18. The process of claim 1, wherein the dry sausage is pepperoni, chorizo, or salami.

19. The process of claim 1, further comprising monitoring the sausage using at least one of a thermal imaging device, a vision system, an inline checkweigher, or an infrared sensor at least one location.

20. The process of claim 1, further comprising weighing the sausage before it enters the chamber and weighing the sausage after it exits the chamber and calculating the reduction in weight of the sausage.

21. The process of claim 1, wherein the sausage remains in the chamber until a moisture to protein ratio of the sausage is reduced to about 2.3:1 or less.

22. The process of claim 21, wherein the sausage remains in the chamber until the moisture to protein ratio is reduced to about 1.6:1 or less.

23. The process of claim 1, wherein the air pressure in the chamber is about one atmosphere.

24. The process of claim 1, wherein the sausage pieces are cut into their final commercial shape prior to entering the chamber.

25. The process of claim 1, wherein the chamber comprises a plurality of cavities extending along the conveyor.

26. The process of claim 25, wherein the conditioned air and the microwaves are provided in the same one of the plurality of cavities.

27. The process of claim 25, wherein the conditioned air and the microwaves are provided in different ones of the plurality of cavities.

28. The process of claim 25, wherein the microwaves are provided in a first one of the plurality of cavities, and the conditioned air is provided in a second one of the plurality of cavities, the second one being downstream of the first one with respect to a direction of movement of the sausage pieces.

29. The process of claim 28, wherein no microwaves are provided in the second one of the plurality of cavities.

30. The process of claim 1, wherein the sausage remains in the chamber for about 2 to 15 minutes.

* * * * *